Oct. 6, 1964    S. F. NADEAU    3,151,520
METHOD AND APPARATUS FOR SIMULTANEOUSLY PRODUCING
A SUPERIMPOSED MULTI-IMAGE DISPLAY
Filed April 21, 1960    2 Sheets—Sheet 1

*INVENTOR.*
STUART F. NADEAU

BY Laurence R. Brown

United States Patent Office 3,151,520
Patented Oct. 6, 1964

3,151,520
METHOD AND APPARATUS FOR SIMULTANEOUSLY PRODUCING A SUPERIMPOSED MULTI-IMAGE DISPLAY
Stuart F. Nadeau, Norristown, Pa., assignor, by mesne assignments, to Drexel Dynamics Corporation, Philadelphia, Pa., a corporation of Pennsylvania
Filed Apr. 21, 1960, Ser. No. 23,756
5 Claims. (Cl. 88—24)

This invention relates to pictorial displays and more particularly, it relates to means and methods of displaying a plurality of messages by lenticular optic means.

The use of lenticular optic means to display a plurality of messages is well known, as evidenced by the U.S. Patent 1,984,004 issued to E. Wildhaber on December 11, 1934. Multi-message displays have, in the past, been prepared individually upon a surface integral with the lenticular array to avoid matching errors and to eliminate the effect of irregularities in formation of minute lens surfaces. This has required the individual preparation of each display under carefully controlled conditions. The conventional method of preparing these displays is to make a photographic exposure of each message consecutively by way of light sources disposed to direct light at unique angles through the lenticular array. This means that a number of exposures made consecutively must be carefully controlled to assure uniformity of each message and to prevent build-up of undesired noise.

It is, therefore, an object of the present invention to provide improved means and methods for preparing lenticular displays.

The improvement is realized by providing a method of writing all messages at one time. This assures a single uniform exposure of each message and prevents any overlap or build-up encountered during consecutive exposures. In essence, this is accomplished by providing a multiple section camera which processes each message independently.

Distinctive features and further advantages afforded by the invention are discussed in detail with reference to the accompanying drawing, wherein.

Figure 1:
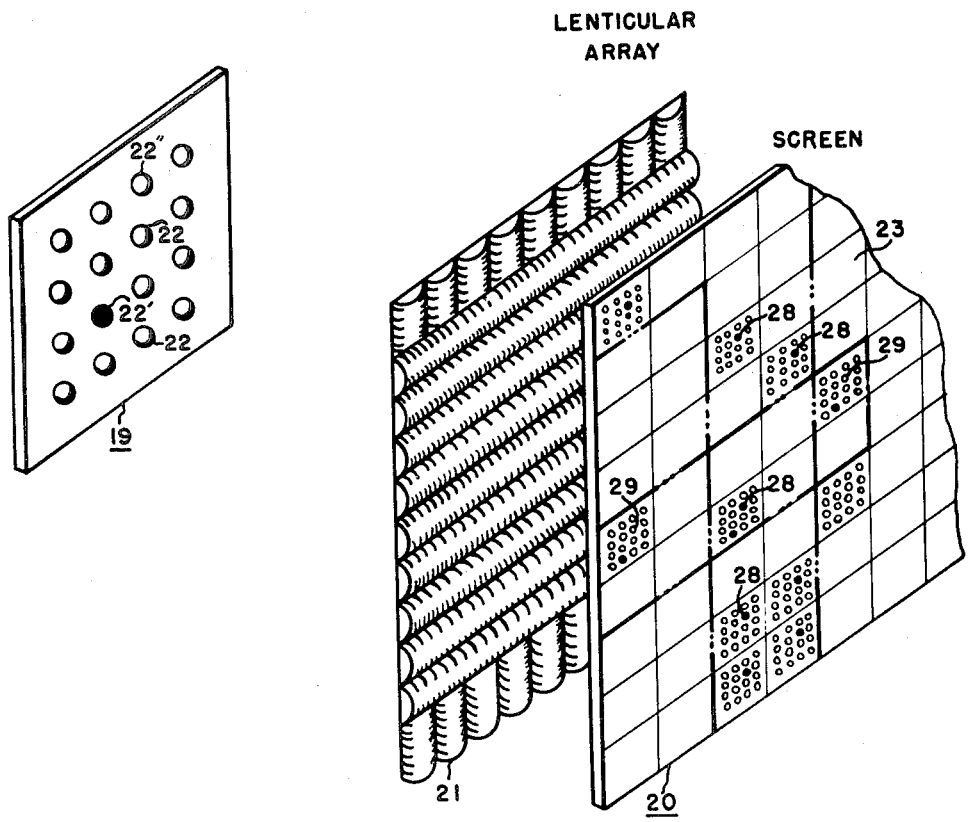
FIGURE 1 is a representative view of a lenticular display.

With reference to FIGURE 1, a typical sixteen message lenticular display is depicted. Thus, upon the photographically responsive screen 20 various messages are written. Consider the numerical digit 1 and dash shown by dot-dash outline. The screen is broken up into discrete cells 23 each corresponding to a coordinate intersection of two cylindrical lenses upon the lenticular array 21. In FIG. 1, the screen 20 is divided into 81 discrete cells 23 as determined by the 9 x 9 lenticular array 21.

Within each cell 23 is a pattern of dots corresponding to different positions upon the selection plane 19. In the selection plane, different light sources 22 may be positioned to probe the screen 20 from different incident angles through the lenticular array 21. For example, light rays from light source position 22′, located at the intersection of the second column and third row, in passing through lenticular array 21 is focused on screen 20 in an elemental dot pattern, the dots being spaced apart and located, in each cell 23, at the inverted corresponding dot position identified by the numeral 28 (or 29), this dot position being located at the intersection of the second row and third column. Assume an opaque numeral 1 is on the photographic screen 20 in the position indicated in FIG. 1 by the dot-and-dash outline. Then, if light source 22′ be illuminated, all dots which occupy a position at the intersection of the second row and third column in all cells 23 which are within the outline of the numeral 1 will be black, and all dots occuping the same dot position (second row, third column) in cells outside the outline of the numeral 1 will be illuminated.

A message digit 1 will be viewed from actuation of light source 22′ since all corresponding dots 28 within the outlined digit 1 on the screen 20 are opaque and all corresponding dots 29 outside the digit 1 are transparent. Similarly, the light source position 22″ may be used to display the outlined dash.

The screen 20 has been conventionally prepared upon a photographically sensitive surface by placing a message transparency of, for example, the numeral 1 upon the lenticular array 21 and selecting a proper light source position, such as 22′ to produce an exposure by shadowing the message upon the corresponding dot positions (second row, third column) of the screen 20. The numeral 2 would, for example, then be produced in dot pattern by illuminating one of the other lamp positions in the selection plane 19. This requires multiple exposures of a photographically sensitive surface, and may result in a high reject rate of finished packages because of non-uniform results between different messages. To improve this undesirable situation, a novel method of preparing messages is disclosed in the present application for preparation of all messages at one time. This method will be explained with assistance of FIG. 2.

Figure 2:
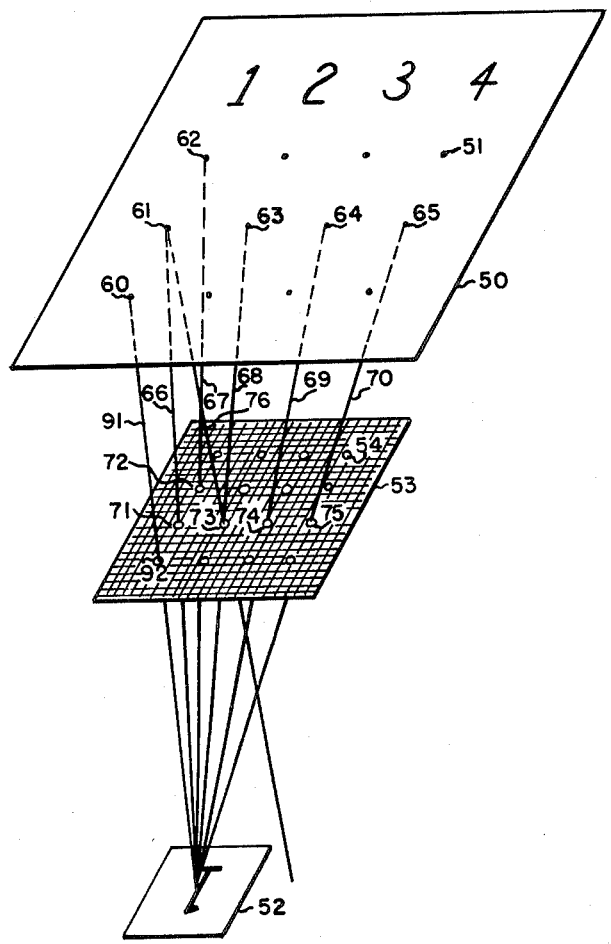
FIGURE 2 is a sketch illustrating the method of preparing the lenticular displays in accordance with the invention.

With reference to FIGURE 2, it may be seen a plurality of messages such as numerical digits 1, 2, 3, 4 are arranged in a geometrical pattern on the object plane 50. Dots 51, etc., locate various ones of the sixteen message positions, which are shown in a 4 x 4 matrix layout for preparing a 16 message display at the image plane 52. A typical message is represented by the digit 1 in image plane 52 and illustrates the manner of presentation of each message image by way of the lens plane 53.

The lens plane 53 has a plurality of apertures 54 in an opaque planar sheet in its simplest form to essentially produce a multiple pinhole camera for superimposing each message from object plane 50 in a combination upon the image plane 52. The lens of apertures of plane 53 are geometrically arranged in a similar 4-by-4 pattern corresponding to that of the messages displayed on object plane 50, as may be seen by considering typical ray paths.

Thus, from message position 62 a group of light rays represented by ray 67 passes through pinhole 72 to produce, in the present example, an image on plane 52 of the number 5 in superimposed registration with the digit 1. Similarly, numbers from all the other message positions, such as 61, 62, 63, 64 and 60 are aligned to pass corresponding groups of light rays represented by rays 66, 68, 69, 70 and 91 through other pinhole lenses 71, 73, 74, 75 and 92, occupying corresponding positions on lens plane 52 to present other numbers in superimposed position on image plane 52.

It may be seen from consideration of ray 76 passing from message position 61 through pinhole 73 (which is adjacent to that of pinhole 71 corresponding geometrically to the message position 61), that the secondary image positions lie off the common image position on plane 52. Thus, there is no need for baffles to prevent interference between the various messages provided the proper geometric arrangement with corresponding size of messages is maintained as shown in FIGURE 2.

As may be seen from the view of FIGURE 2, the effect of the lens plane 53 is to always focus the messages from the sixteen separate positions in object plane 50 exactly upon the image plane 52 in superimposed registration. As contrasted with previous shadow techniques, this improves definition of the written messages.

It will be understood that the lens plane 53 of FIG. 2 corresponds to selection plane 19 of FIG. 1 and that image plane 52 of FIG. 2 corresponds to the combined lenticular array 21 and the closely spaced photographic screen 20 of FIG. 1. The spacing between the lenticular array 21 and screen 20 is, of course, such that the screen 20 is in the focal plane of the lens of the lenticular array 21. Stated another way, it will be understood that by exposing the entire area of object plane 50 simultaneously to a source of light, all sixteen numbers, from 1 to 16 in the present example, are, by virtue of the lens plane 52, focused in superimposed positions at the image plane 52. Thus, if the image plane 52 consist of the combination of the lenticular array 21 and photographic screen 20 disposed at the focal distance of the lens of lenticular array 21, and if the lens in the lens plane 52 focus the rays on the lenticular array 21, then each of the sixteen numbers on screen 20 consists of spaced-apart elemental spots or dots. Thus, the sixteen numbers are superimposed on each other in interdotted fashion with no elemental spot of any number being superimposed upon any other elemental spot of any other number.

It is evident, therefore, that by use of this camera technique a method of preparing multiple messages at one time is afforded while improving the registration and exposure uniformity between the various messages. Thus, the state of the art is significantly improved by practice of this invention as defined with particularity in the following claims.

I claim:

1. A method of producing simultaneously a superimposed multi-image display in which each of a plurality of superimposed images is composed of a plurality of spaced-apart elemental dots, the dots associated with each different image being disposed in interdotted relation with those of the other images with none of the dots being superimposed upon each other, said method comprising the steps of providing an object plane having thereon in spaced-apart arrangement all of the objects to be displayed, each object occupying a separate and distinct area of the object plane, focusing each of said plurality of objects simultaneously in superimposed positions on a lenticular array of tiny lenses, providing a photographic surface in the focal plane of said lenticular lens, and illuminating simultaneously all of the objects on the object plane.

2. A method of producing simultaneously a superimposed multi-image display in which each of a plurality of images is composed of a plurality of spaced-apart elemental spots, the spots associated with each different image being disposed in interspotted relationship with those of the other images, with none of the spots being superimposed on each other, said method comprising the steps of providing an object plane having thereon in spaced-apart arrangement all of the objects to be displayed, each object occupying a separate and distinct area of the object plane, focusing each of said plurality of objects simultaneously in superimposed positions on an array of tiny lenses, providing a display surface behind said array of tiny lenses and closely spaced therefrom, and illuminating simultaneously all of the objects on the object plane.

3. Apparatus for producing simultaneously a superimposed multi-image display in which each of the superimposed images is comprised of a plurality of spaced-apart elemental dots, the dots associated with each different image being disposed in interdotted relationship with those of other images with none of the dots of any of the images being superimposed on each other, said apparatus comprising: an image surface on which the dots of all of the different images are to be displayed in superimposed interdotted fashion; an object plane having thereon all of the objects to be displayed, each object occupying a separate and distinct area of the object plane; a lens plane interposed between said object plane and said image surface, said lens plane having a plurality of spaced-apart object lenses, one for each different object, said lenses being disposed in an arrangement corresponding to that of the separate and distinct areas of said object plane; an array of tiny lenses disposed between said lens plane and said image surface; said object plane, lens plane and tiny lens array being so disposed relative to each other that each different object on said object plane is focused by a different one of said lenses of the lens plane on the same common area of said tiny lens array; said tiny lens array being disposed at such close distance from said image surface that each tiny lens focuses rays from each different object lens on a different elemental spot on said image surface; and means for illuminating simultaneously all of the objects on said object plane.

4. Apparatus as claimed in claim 3 characterized in that said image surface comprises a photo-sensitive surface.

5. Apparatus as claimed in claim 3 characterized in that said tiny lens array is a lenticular array and in that said image surface is in the focal plane of said lenticular array.

References Cited in the file of this patent

UNITED STATES PATENTS

| | | |
|---|---|---|
| 1,984,004 | Wildhaber | Dec. 11, 1934 |
| 2,167,107 | Dvornik | July 25, 1939 |
| 2,848,638 | Smith | Aug. 19, 1958 |
| 2,931,027 | Blefary et al. | Mar. 29, 1960 |
| 2,981,140 | Ogle | Apr. 25, 1961 |

FOREIGN PATENTS

| | | |
|---|---|---|
| 395 of 1900 | Great Britain | Jan. 5, 1901 |
| 421,231 | Great Britain | Dec. 17, 1934 |